United States Patent

[11] 3,534,840

[72] Inventor Joseph B. Snoy
Rockford, Illinois
[21] Appl. No. 784,713
[22] Filed Dec. 18, 1968
[45] Patented Oct. 20, 1970
[73] Assignee Twin Disc, Incorporated
Racine, Wisconsin
a corporation of Wisconsin

[54] HYDRAULICALLY ACTUATED CLUTCH HAVING A TWO PIECE FEED BACK DUMP VALVE
4 Claims, 5 Drawing Figs.
[52] U.S. Cl. .................................................. 192/106,
192/87.12, 192/103
[51] Int. Cl. .................................................. F16d 25/00
[50] Field of Search .................................... 192/106(F),
103(F)—1, 104(F), 85, 85(A), 85(A)—2, 87.12

[56] References Cited
UNITED STATES PATENTS
2,297,480 9/1942 Kratzmann ............... 192/104(F)UX
2,771,976 11/1956 Smirl ............................. 192/85A2
3,094,203 6/1963 Jania et al. .................. 192/106(F)UX Primary Examiner—Benjamin W. Wyche, III
Attorney—James E. Milles ABSTRACT: A two piece valve in the fluid inlet to piston actuating chamber of a hydraulically actuated friction clutch, which valve balances the centrifugal head due to the supply fluid, thus making actuation of the clutch directly responsive to the actual control pressure and uninfluenced by this centrifugal head of the fluid supply column.

One piece of the valve is formed as a piston which permits a "feedback" feature to assist in rapid dumping of the actuating chamber through the valve, and also permits the weight of a portion of the valve to be changed, thereby changing the clamp-up force characteristic curve of the clutch.

Patented Oct. 20, 1970
3,534,840
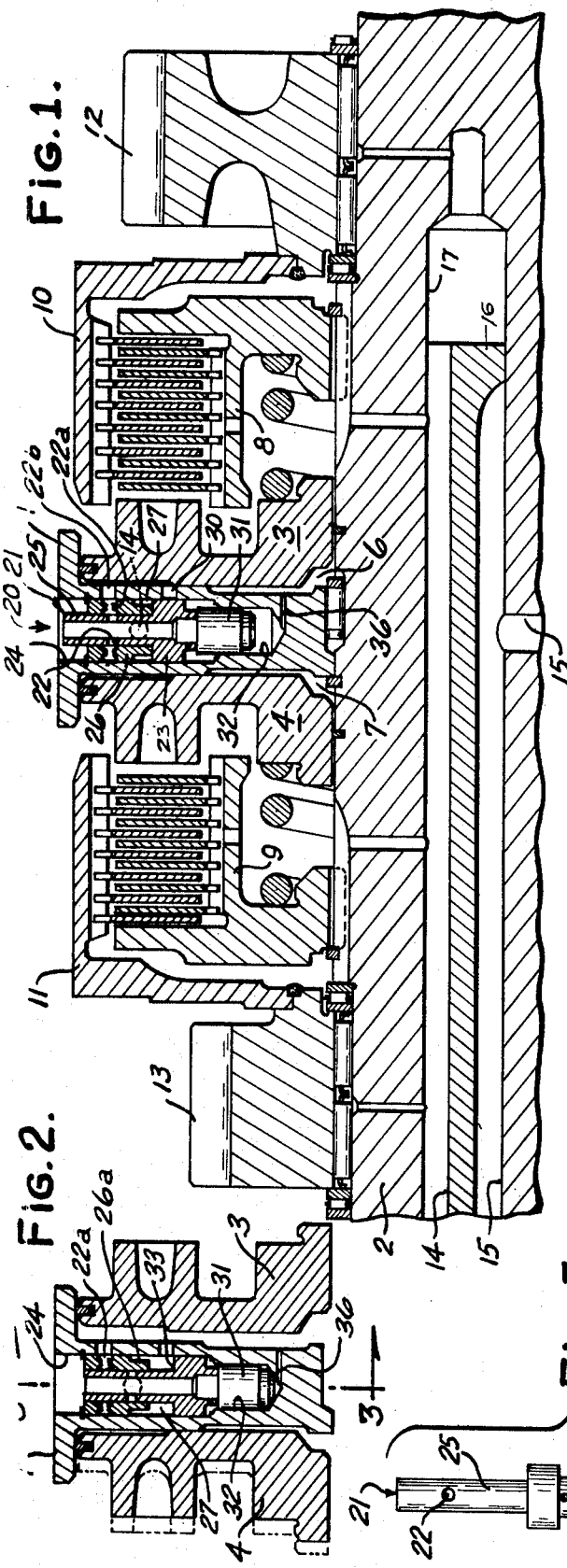
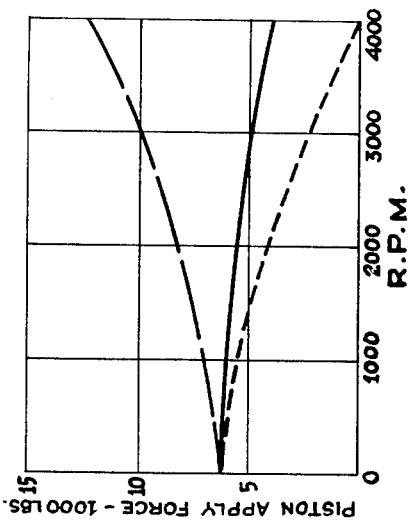
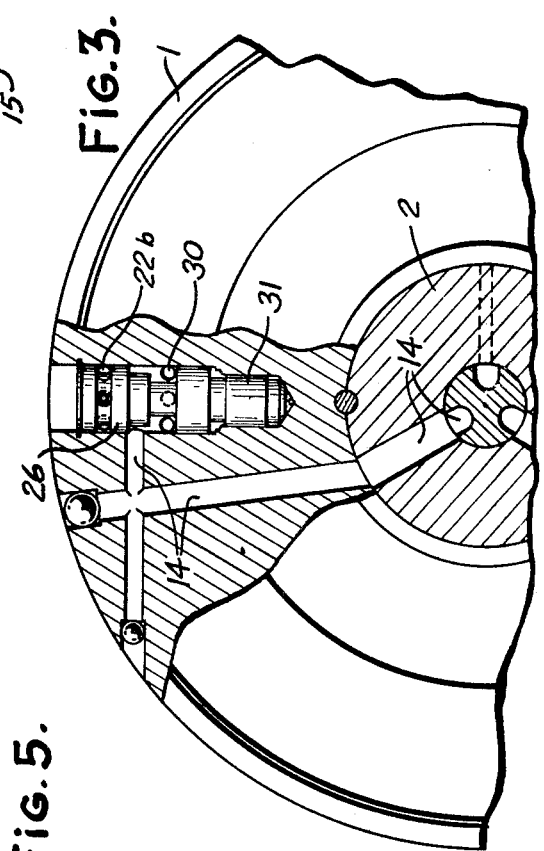
INVENTOR:
JOSEPH B. SNOY
BY: James E. Nilles
ATTORNEY

HYDRAULICALLY ACTUATED CLUTCH HAVING A TWO PIECE FEED BACK DUMP VALVE

BACKGROUND OF THE INVENTION

The invention pertains to hydraulically actuated friction clutches in which pressure fluid is supplied to the hydraulic cylinder to actuate the piston. This fluid is introduced from near the centerline of the clutch, usually from rifle drilling in the center shaft, and is directed radially outwardly where it enters the expansible fluid chamber formed by the cylinder and piston. This forms a generally radially extending column of fluid which is subjected to centrifugal force and develops a considerable head acting on the piston, over and above any control pressure applied to the fluid.

In order to compensate for or balance this centrifugal head of the column of fluid, attempts have been made to solve this problem by the use of centrifugally operated valves such as shown in the U.S. Pats. to C. R. Hilpert, Nos. 3,368,656 of Feb. 13, 1968, or 3,358,796 of Dec. 19, 1967. These devices worked very satisfactorily for their intended purposes.

SUMMARY OF THE INVENTION

The present invention provides a hydraulically actuated friction clutch having a two piece centrifugally shiftable valve which (1) compensates for the head set up by the rotating column of supply fluid; (2) permits the actuating chamber to be dumped extremely rapidly when the supply of actuating fluid pressure is shutoff, by causing the fluid being expelled from the chamber to act in a "feedback" fashion, and under centrifugal force forcibly act on the dump valve to urge it rapidly in a radial outer, fluid dumping direction, thus centrifugal force on the valve together with the force of the fluid being dumped both act to ensure rapid exhaust of the actuating chamber; (3) has one piece formed as a piston that permits changing of the clamp-up force characteristic of the clutch; and (4) eliminates concentricity problems.

BRIEF DESCRIPTION OF THE DRAWING

FIG. 1 is a fragmentary, longitudinal, cross-sectional view through a clutch made in accordance with the present invention; and showing the valve position when the clutch is released;

FIG. 2 is a view similar to a portion of FIG. 1 but showing the clutch engaged;

FIG. 3 is a cross-sectional view taken along line 3–3 in FIG. 2;

FIG. 4 is a chart of clamp force for a feedback dump valve made in accordance with the present invention; and FIG. 5 is an elevational view of the two-piece valve showing the pieces as apart from one another.

DESCRIPTION OF A PREFERRED EMBODIMENT

The invention has been shown as applied to a duplex clutch but of course it can also be used with a single clutch. The duplex clutch shown includes a central reaction member 1 which is fixed on a shaft 2 for rotation therewith, and a pair of pistons 3 and 4 are slidable on the shaft, one on each side of the central reaction member defining therewith the actuating chambers 6 and 7. Hub members 8 and 9 are fixed on the shaft by their respective splines, and drums 10 and 11 are provided respectively for the hubs 8 and 9. Conventional interleaved clutch plates are provided between the hub 8 and its drum 10 similarly between hub 9 and its drum 11. The drums 10 and 11 each have a gear 12 and 13, respectively, fixed therewith, and the drums and their respective gears rotate freely on the shaft 2. Clamp-up of the clutch plates causes rotation of corresponding gear with the shaft in the known manner.

Supply passage means 14 and 15, are formed by the three-fluted plug 16 which is inserted in the drilled hole 17 in shaft 2. These passage means 14 and 15 then extend radially through the reaction member to conduct fluid pressure respectively to the actuating chambers 6 and 7. The actuating chambers 6 and 7 are selectively pressurized to cause extension of the piston and clamp-up of its adjacent clutch pack.

A valve 20 is provided in the rotatable member 1 for each of the actuating chambers 6 and 7, and as they are identical and furthermore can be used in a single clutch, only one of the valves will be described in detail.

The valve 20 is of two piece construction and includes an outer, valve element 21 which is hollow or of tubular shape and has exhaust cross ports 22 extending therethrough and in communication with the interior of element 21. Element 21 has an enlarged diameter 23 which forms a piston slidable in the generally radially extending bore 24 formed in the rotatable member 1. The smaller diameter, outer end 25 of the element 21 slides in the sleeve 26 which is fixed in the bore 24. Sleeve 26 has exhaust cross ports 22a which is in alignment with ports 22 in the valve element 21 when the element is in the fluid dumping position shown in FIG. 1. Exhaust cross ports 22b are formed in member 1 and places actuating chamber 6 in fluid discharging communication with the interior of element 21, via ports 22 and 22a, as shown in FIG. 1.

Sleeve 26 also has a reduced portion 26a which forms an annular fluid supply chamber 27 that receives pressure fluid from the supply passage means 14 in member 1. This supply chamber 27 expands as valve element 21 is moved radially inwardly by fluid pressure in supply passage means 14, to thereby charge the actuating chamber 6 via the feed port 30 in member 1.

The two piece valve 20 also includes a weight piston 31 which sealingly slides in a smaller bore 32 at the inner end of and concentric with bore 24.

Piston 31 may be made of a metal different from that of valve element 21 so as to give different clutch clamp-up force characteristics, as shown by the curves of FIG. 4. For example, the solid line curve represents an aluminum element 21 and an aluminum piston 31. The dotted curve shows the characteristics when the element 21 is of aluminum and the piston 31 is of steel.

The area of shoulder 33 on element 21, between small end 25 and enlarged end 23, is made approximately equal to the cross-sectional area of the inner end of piston 31. The said shoulder area may be referred to as the "clutch applying" surface, while the area of the piston end is the "feedback" surface. Balancing these areas ensures that the valve is in equilibrium, that is the pressure in the clutch chamber 6 is equal to the supply pressure, notwithstanding the feedback feature to be described.

It will be noted that member 1 and the insert sleeve 26 provides three separate and concentric bores. By making the valve 20 in two pieces, considerable manufacturing and valve operating problems have been eliminated because concentricity need be precisely maintained between only the two diametrical surfaces of element 21 and their corresponding bores. Piston 31 can shift relative to element 21 and adjust itself to its bore 32 without respect to the other bores.

When the valve is in the radially inward position, (FIG. 2) as for example when the supply passage 14 is pressurized, fluid is directed into the chamber 27, passage 30 and then into the actuating chamber 6 to cause clutch engagement. At this time, the discharge port 22b is blocked by the smaller end 25 of the valve 21.

The weight of the two piece valve 20 may be such that it counterbalances the weight of the fluid that extends from the central rifle drilling in the shaft 2 outwardly to the valve 20. In other words such a column of fluid creates a considerable head, due to centrifugal force of the rotating clutch, and this head is counterbalanced by the weight of the two-piece valve. In this manner, the actuating chamber 6 of the clutch is subject only to a control pressure of the fluid in the supply passage 14.

After the clutch has been actuated and it is desired to release it, the fluid supply pressure is cut off from the associated supply passage 14, centrifugal force moves the valve 20 outwardly, closing passage 30. Also, due to the action of the centrifugal head of the fluid in the actuating chamber 6, this fluid acts via feedback port 36 on the radially inner "feedback" surface to the piston 31, and causes extremely rapid shifting of the valve to the radially outward, dumping position. It is this feedback action of the fluid in the actuating chamber that aids the centrifugal force acting on the valve, to thereby cause rapid shifting of the valve to the dumped position. (FIG. 1)

When in the outer dumping position, the exhaust cross port 22 in the valve end 25 is aligned with the discharge port 22a and 22b located adjacent the outer diameter of the actuating chamber, permitting the actuating chamber to be quickly dumped through the hollow valve end 25.

I claim:

1. A hydraulically actuated friction clutch mechanism of the type having a rotatable member which together with a slidable piston defines an expansible clutch actuating chamber that is pressurizable to cause clutch engagement, said member having a two-piece valve radially slidable in said member and defining an expansible fluid supply chamber therewith, fluid supply passage means in said member and in fluid delivering communication with said supply chamber, a feed port in said member and extending from said actuating chamber and communicable with said supply chamber when said passage means is pressurized thereby urging said valve to a radially inner position whereby pressure fluid in said supply passage enters and expands said actuating chamber, said member having a feedback port extending from said actuating chamber to the radially inner end of said two-piece valve; said two-piece valve having a separate piston at the radially inner end thereof, whereby when said passage means is not pressurized, said valve is shifted radially outwardly due to centrifugal force and also due to fluid in said actuating chamber feeding back and acting on the radially inner end of said separate piston, said rotatable member also having a discharge port extending from adjacent the outer diameter of said actuating chamber and when said valve is shifted to said radially outward position, fluid in said actuating chamber can then be dumped quickly and completely through said member discharge port.

2. The mechanism set forth in claim 1 further characterized in that the area of said radially inner end of said separate piston is approximately equal to the cross-sectional area of said supply chamber to thereby maintain equilibrium of said valve.

3. A hydraulically actuated friction clutch mechanism of the type having a rotatable member which together with a slidable piston defines an expansible clutch actuating chamber that is pressurizable to cause clutch engagement, said member defining a generally radially extending outer bore therein and also having a smaller bore concentric with said bore and located radially inwardly of said bore, a two-piece valve having a generally hollow element having a small end slidable in said outer bore, said small end having an exhaust cross port therein and in communication with the interior of said hollow end, said element also having a diametrically enlarged end which is sealingly slidable in said smaller bore and defining an expansible fluid supply chamber therewith, fluid supply passage means in said member and in fluid delivering communication with said supply chamber, a feed port in said member and extending from said actuating chamber and communicable with said supply chamber when said passage means is pressurized thereby urging said valve to a radially inner position whereby pressure fluid in said supply passage enters and expands said actuating chamber; said two-piece valve also having a separate piston slidable in said smaller radially inward bore, a feedback port in said rotatable member and extending from said actuating chamber to the radially inner end of said smaller bore; whereby when said passage means is not pressurized said two-piece valve is shifted radially outwardly due to centrifugal force and also due to fluid in said actuating chamber feeding back via said feedback port and acting on the radially inner end of said separate piston, said rotatable member also having a discharge port extending from adjacent the outer diameter of said actuating chamber and alignable with said exhaust cross port of said small end of said hollow element when said valve is shifted to said radially outward position, whereby fluid in said actuating chamber can then be dumped quickly and completely through said rotatable member discharge port and said hollow element.

4. The mechanism set forth in claim 3 further characterized in that the area of said radially inner end of said separate piston is approximately equal to the cross-sectional area of said supply chamber to thereby maintain equilibrium of said valve.